Sept. 1, 1953 R. KOBLER 2,650,951
REMOTELY-CONTROLLED RECORDING SYSTEM
Filed Jan. 6, 1951
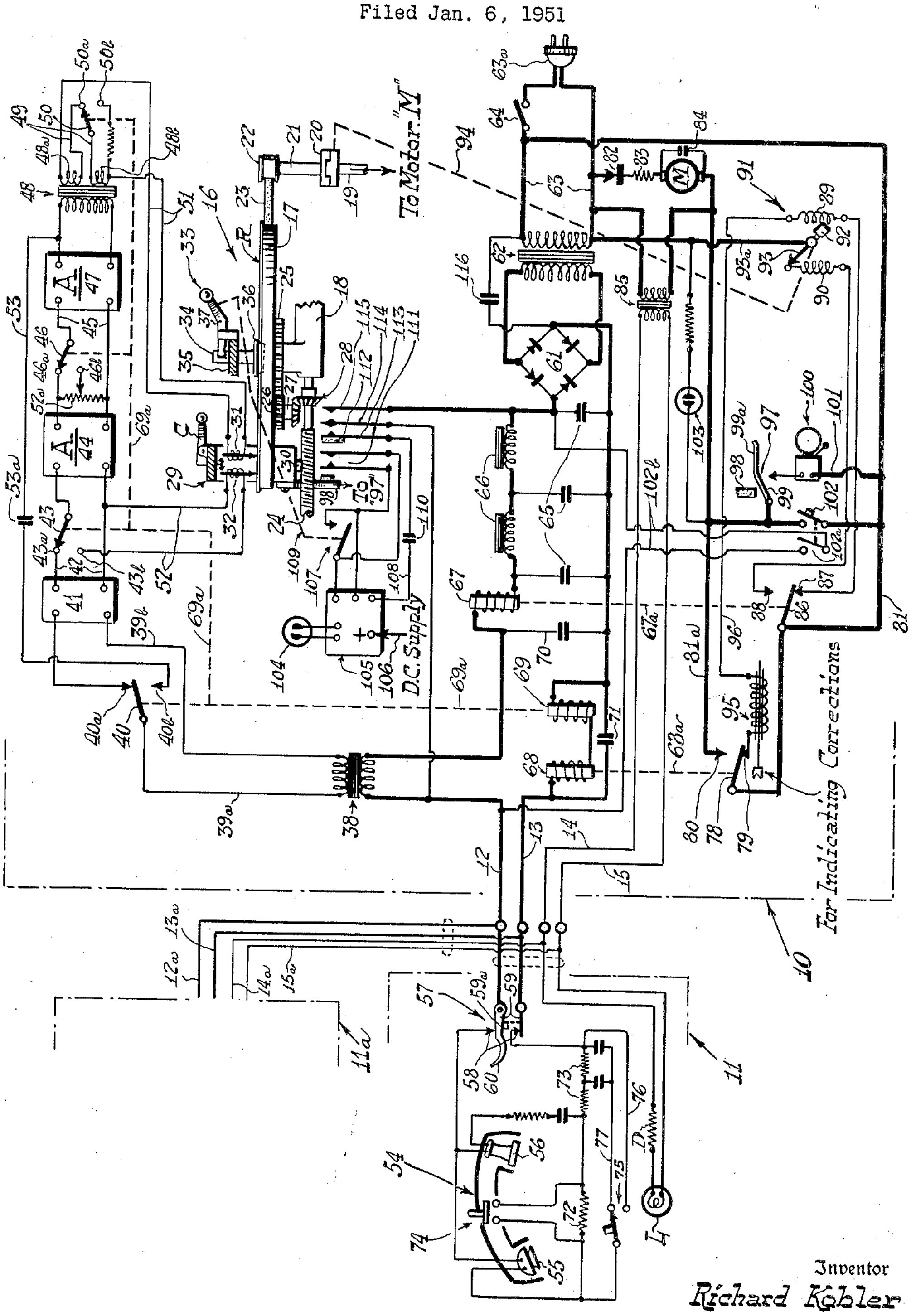
Inventor
Richard Kobler
By Henry Lanahan
Attorney Patented Sept. 1, 1953

2,650,951

UNITED STATES PATENT OFFICE 2,650,951

REMOTELY CONTROLLED RECORDING SYSTEM

Richard Kobler, New York, N. Y., assignor to Thomas A. Edison, Incorporated, West Orange, N. J., a corporation of New Jersey Application January 6, 1951, Serial No. 204,794

19 Claims. (Cl. 179—100.1)

This invention relates especially to dictation-recording systems wherein the dictator's station is remote from the dictating machine itself, and more particularly the invention relates to improved electrical circuit arrangements for such systems which enable dictation recording, playback, correction markings, and other indicating functions for transcribers usually associated with dictating machines, to be performed at a remote station, or at any one of a plurality of remote stations, with the use of a minimum number of lead wires between each remote station and the home station where the dictating machine is located, hereinafter referred to as the "attendant's station."

My invention relates also particularly to improvements in remotely-controlled dictation-recording systems which enable such systems to operate satisfactorily with the use of a single recording machine. Normally, to permit in remotely-controlled systems an uninterrupted recordation of dictation, especially of any one dictation unit—i. e., any single complete subject matter such as a letter, memorandum, routine report, medical case report, etc. of normal length—a pair of sequentially-operated recording machines are provided at the attendant's station so as to permit a change of record on one machine while the recordation of dictation is continued on the other machine. The use of sequential machines adds materially to the cost of the remotely-controlled system, so much so as to place the system out of the price range of many applications, particularly since the dictation-recording machines themselves represent so large a percentage of the overall cost of any remotely-controlled system.

The improvement according to my invention which enables the use of a single dictation-recording machine in a remotely-controlled system is based on the observation that certain major users of dictation-recording machines spend on the average about two minutes to record a dictation unit and that they record on the average about two dictation units, for a total of about four to five minutes use of the machine, during each dictation period, the term "dictation period" being herein used to mean the time elapsed from the lifting of the hand set from its support to the instant it is returned back onto its support. Remote-station dicators have no objections to the operation of the machine being suspended temporarily for a change of record so long as such suspension falls between successive dictation periods. Suspensions which come between successive dictation periods are generally never detected by the dictator, because many such suspensions will occur between dictation periods of different dictators, and even when the suspension comes between successive dictation periods by the same dictator, the attendant will normally make the record change before the dictator has assembled his material for the start of the next-succeeding period. By my invention, the dictating-machine system is controlled in a novel manner normally to prevent the start of a dictation period at such far point along the record that the period cannot be finished within the remaining recordation time on the record.

Accordingly, a general object of my invention is to provide improvements and simplifications in remotely-controlled dictation systems which enable such systems to be made and sold at appreciably lower cost than has been heretofore possible.

Another object is to provide improved controlling circuits and combinations of such circuits for remotely-controlled dictation-recording systems, which permit all necessary control functions to be fulfilled, and the audio circuits to be completed, through the medium of only four wires running from each remote station.

Another object is to provide remotely-controlled dictation-recording systems wherein warning signals of different level and character are fed into the communication line to apprise the dictator as to the condition of the machine.

A further object is to provide a simplified remotely-controlled dictation-recording system wherein each remote station has a lesser number of manual controls than the number of control functions to be performed, and wherein certain of the control functions are performed in response to selected combinations of the manual controls.

A further object is to provide such simplified system wherein the less frequent control operations are effected in response to operation of combinations of the manual controls.

Another object is to provide a simplified system of the character referred to wherein selected sequential operation of a plurality of the manual controls is required to effect a certain control function.

Another object is to provide a simplified system of the character mentioned wherein three different control functions are performed selectively by establishing the current in the control circuit at three different levels.

As will appear, the present system is a further development of the novel remotely-controlled dictation recording system shown and claimed in my pending application Serial No. 701,896, filed October 8, 1946, and entitled "Remote Controlled Recording Machine," and issued April 3, 1951, as Patent No. 2,547,216.

The foregoing objects and features of my invention will be apparent from the following description and the appended claims.

In the description of my invention reference is had to the accompanying schematic drawing showing circuits and mechanisms of a remotely-controlled dictation-recording system embodying the features of my invention.

The system shown in the accompanying drawing to illustrate my invention comprises an attendant's station generally referred to as 10, and one or more remote dictators' stations of which one referred to as 11 is shown in full and another referred to as 11a is represented diagrammatically, it being understood that all dictators' stations are alike. The dictators' stations are connected in parallel with each other and to the attendant's station by means of four leads running from each station, there being the leads 12, 13, 14 and 15 connecting station 11 to the attendant's station and four branch leads 12a, 13a, 14a and 15a connecting the other station 11a to the attendant's station.

The attendant's station includes a single dictation-recording machine 16 which, for the present purposes, may be shown fractionally and to a large extent diagrammatically. This machine comprises a turntable 17 journalled in a bearing 18 and driven by a motor M through a shaft 19, clutch 20, shaft 21, drive pulley 22 and belt 23 which engages a track on the periphery of the turntable. A carriage feed screw 24 is driven by the turntable through a gear 25 mounted on the under side of the turntable, a pinion gear 26 on a shaft 27 which meshes with the gear 25, and right-angle gearing 28 which connects the shaft 27 to the feed screw. A carriage 29, which is mounted for movement across the turntable by any suitable means not shown, is driven as from left to right by the feed screw 24 through a feed nut 30. This carriage supports a recording device 31 and a reproducing device 32 both of which are shown only diagrammatically. These devices are controlled through any suitable well-known mechanism, not herein necessary to show, so that both are moved onto a record disc R on the turntable 17 as a control lever C on the carriage 29 is moved to record position, so that both are moved away from the record disc as the lever C is moved to a neutral position, and so that only the reproducer 32 is moved onto the record disc as the control lever C is moved to a reproduce position. The reproducer is set at a fixed trailing distance from the recorder. The attendant normally leaves the control lever C in record position. Only during a change of record is this lever moved to neutral position, and only on special instructions from the dictator is the lever ever put in reproduce position. Since, when the lever C is in record position, both the recorder and reproducer are in engagement with the record, with the latter at a trailing distance from the former, a dictator may reproduce the recorded matter between these devices merely by shifting the electrical circuit connections of the devices without mechanically shifting them with respect to the record. This permits the dictator to reproduce the last line or so of his dictation with the use of only simple control apparatus and without possible re-recording on the record with resultant eradication of matter already recorded.

The record disc R is held on the turntable by a suitable clamp 33 herein shown simply as a plunger 34 slidably mounted in a frame member 35 and having a clamping and centering head 36 at its lower end for engaging the central hub portion of the disc as the plunger is moved downwardly as by a handle 37 pivoted to the frame.

The audio circuits of the phonograph per se comprise an audio transformer 38 the secondary of which is connected by leads 39a and 39b, of which the lead 39b is a ground for the audio circuits, through a switch pole 40 and contact 40a to an equalizer and volume-control device 41 herein only diagrammatically shown since the invention is not concerned with the device per se. The volume-control device 41 is connected by leads 42, through a switch pole 43 and contact 43a, to a voltage amplifier 44 herein also only diagrammatically shown. The voltage amplifier 44 is connected by leads 45, through a switch pole 46 and contact 46a, to a power amplifier 47 likewise only diagrammatically shown. The power amplifier 47 feeds into a power output transformer 48 having two secondary windings 48a and 48b. These secondary windings can be serially connected by leads 49 through a switch pole 50 and contact 50a, and the outer ends of these windings are connected by leads 51 to the recorder 31. Thus, when the switch pole 50 engages the contact 50a, a circuit is completed from the transformer to the recorder 31 to feed into this device signals for recordation on the record disc R.

All of the switch poles 40, 43, 46 and 50 are tied together mechanically to work in unison, as in herein later described. When the poles engage the respective associated contacts having the suffix letter "*a*," the audio system is conditioned for recording—i. e., signals that are fed into the audio transformer 38 are amplified and fed into the recorder 31 to be recorded on the record disc.

Associated with each of the four switch poles above-mentioned is a second contact bearing the number of the switch pole with the suffix letter "*b*." When the switch poles are thrown to make with the "*b*" contacts, the reproducer 32 is connected by leads 52, through pole 43 and contact 43b, to the voltage amplifier 44, the voltage amplifier 44 is in turn connected through a volume control 52a, pole 46 and contact 46b to the power amplifier 47, and the power amplifier 47 is in turn connected by a lead 53, blocking condenser 53a and contact 40b to pole 40 to connect the amplifier output to the audio transformer 38. Thus, signals picked up by the reproducer are now fed through the voltage and power amplifiers to the audio transformer. As will be apparent, these signals are fed to the dictator's station.

The audio transformer 38 is connected in a communication circuit leading to each of the dictators' stations via the leads 12 and 13. This communication circuit, which is hereinafter sometimes referred to as the circuit 12—13, has a reference or ground side represented by the line 13. At each dictator's station there is a telephone-type hand set 54 having a microphone 55 and a receiver 56 mounted in the opposite end portions thereof. The microphone 55, which is preferably of the resistance type, and the receiver 56 are connected in the communication circuit 12—13. Also, in this communication circuit, at each station, there is an on-off station switch 57 comprising stationary contacts 58 and cooperating movable pole members 59 which are interconnected by an insulating bridge 59a and which are urged upwardly normally to engage the contacts 58. A support for the hand set 54 is associated with the station switch to cause the station switch to be held open whenever the hand set is placed therein, such support being herein diagrammatically represented by a hook extension 60 on one of the pole members of the station switch.

The communication circuit 12—13 has therein a source of direct current for energizing the microphone 55 and for control purposes in accordance with my application Serial No. 701,896 aforementioned. This source comprises a full-wave rectifier 61 connected via a power transformer 62 and power line 63, having therein a master control switch 64, to a plug 63a which is to be connected to a suitable A.-C. power line not shown. The rectified current from the source 61 is filtered by three shunt condensers 65 across the lines 12 and 13 and two intervening choke coils 66 serially in the line 12. In the filtered portion of the communication circuit there are three control relays 67, 68 and 69 in series, the relay 67 being in the line 12 and the relays 68 and 69 being in the ground line 13. (This line 13 is maintained effectively at ground potential by connection thereof through condenser 116 to the ground side of the power line 63.) Since the communication circuit also carries audio signals between the audio transformer 38 and the hand set 54, the relay coil is preceded by a shunt condenser 70 and the relays 68 and 69 are shunted by a condenser 71 so that the audio currents will be shunted around these high-impedance inductive elements.

The three relays 68, 67 and 69 are adapted to operate, in the order here named, at predetermined successively-higher D.-C. current levels, as in the manner of the two relays in my pending application aforementioned. In order to establish these current levels for successive operation of the relay 68 alone, of the relays 67 and 68, and of all three relays, there are provided voltage cut-down resistors 72 and 73 in series in the communication circuit at each station. The resistor 72 is shorted out by a push-operable switch 74 in the hand set 54 and both resistors 72 and 73 are shorted out by a single-pole double-throw push-operable switch 75 and an associated lead 76. In the normal position of the switch 75 shown in the drawing, the same connects a condenser bypass circuit 77 around these resistors so that they do not impede the flow of the audio currents.

In the present application the term "operated" is used in relation to the switches 57, 74 and 75 to mean that their push-operable members are depressed. Thus, station switch 57 is in "off" or open position when operated and in "on" or closed position when unoperated, switch 74 is closed when operated and switch 75 is connected to the shorting line 76 when operated.

When the hand set 54 is on its support, the station switch 57 is held operated in open position to disconnect the station from the communication circuit. As the hand set 54 is removed, the station switch returns to its normally-closed condition to establish the lowest-level D.-C. current in the communication circuit through both voltage cut-down resistors 72 and 73 to cause operation of only relay 68. When, while the hand set is off its support, the dictator depresses switch 74 to short resistor 72, the next higher level of D.-C. current is established and both relays 67 and 68 are operated. Alternatively, if while the hand set is off its support the dictator depresses switch 75, the third and highest current level is established in the communication circuit to cause all three relays to be operated.

The relay 68 operates a switch pole 78, as represented by the tie line 68a, to cause this pole to engage normally a switch contact 79. When the relay is energized, this pole is moved into engagement with a contact 80. As the pole engages the latter contact, a circuit for the motor M is completed across the power line 63 via a lead line 81 from the grounded side of the power line, pole 78, contact 80 and line 81a through the motor to the other side of the power line. The motor is typically of the D.-C. type, and is accordingly connected in series with a rectifier 82 and a filter resistor 83, and in shunt with a filter condenser 84. Also, a primary winding of a transformer 85 is connected across the power line through the circuits 81 and 81a when the pole 78 makes with the contact 80. The secondary of this transformer is connected through the interstation leads 14 and 15 and resistor D to a lamp L at each station, herein called a "busy signal lamp," the purpose of resistor D being to permit compensation for different lengths of leads 14 and 15, as when the dictators' stations are at different distances from the attendant's station, so that all busy lights will have the same brilliance. Thus, when any one dictator removes the hand set 54 from its support, the relay 68 is operated to cause the motor M to run and to cause busy lights to go on at all stations. A closure of the audio circuit 12—13 by removal of a handset from its support at any one of the remote stations, and/or a starting of a drive motor M or other conditioning of the drive means for start-stop operation of the system, is herein considered to be an activation of the system for operation.

The relay 67 operates a switch pole 86, as represented by the tie line 67a, which normally makes with a contact 87 and which is moved to a contact 88 when the relay is actuated. Switch pole 86 is connected to the line 81 running from the grounded side of the power line 63, whereas the contacts 87 and 88 are connected respectively to stop and start coils 89 and 90 of an electromagnetic clutch actuator 91. This clutch actuator has a pivoted armature 92 carrying a switch pole 93 and is connected to the ungrounded side of the power line 63 by a lead 93a. The switch pole 93 makes contact with the end terminal of the stop coil 89 as the start coil 90 is energized and with the end terminal of the start coil as the stop coil 89 is energized, the operation being thus to break the circuit of whichever coil is energized and to prepare the circuit of the other coil for subsequent energization. The armature 92 is connected to the movable element of the clutch 26, by a connection 94 diagrammatically represented, so as to engage this clutch to start the turntable rotating as the start coil 90 is energized and to disengage the clutch to stop the turntable as the stop coil 89 is energized. Since the pole 86 makes normally with the contact 87, the stop coil 89 is normally the last energized and the clutch is normally disengaged however, as a dictator closes the push switch 74, hereinafter termed the "start-stop switch," the relay 67 is energized to move the pole 86 against the contact 88 wherefore to energize the start coil 90 and cause the clutch to be engaged. As the start-stop switch 74 is next released, the reverse action takes place.

The relay 69 comprises the four single-pole, double-throw switches of the audio circuit of the dictating machine hereinbefore described, which are the switches having poles 40, 43, 46 and 50 respectively. These switch poles are mechanically interconnected and associated with the relay as represented diagrammatically by the tie line 69*a*. When the relay 69 is unenergized, which is its normal condition, the four switches occupy the positions shown to condition the audio system for recording from the microphone 55 via the communication circuit 12—13, audio transformer 38 and the amplifier system to the recorder 31. When, however, the switch 75 is depressed—this being hereafter termed the "playback switch"—not only are the relays 67 and 68 energized to cause the motor M to run and the clutch 20 to be engaged, but also the relay 69 is energized to condition the system for reproduction from the reproducer 32 via the amplifier system, audio transformer 38 and communication circuit 12—13 to the receiver 56. In all cases so long as the station switch 57 is in its unoperated or closed position, whether the dictator is recording, reproducing or merely holding the machine on stand-by, all busy lights L will be on.

As is customary in dictation-recording systems, provision is made to enable the dictator to make indicating marks for the transcriber to aid in transcribing the recorded material, such as correction marks, length marks, rush marks, etc. These devices are usually termed "indexing devices." Indexing devices, which are themselves well known, may be solenoid-operated, and for illustration purposes one such solenoid 95 is herein shown which may for instance be for making correction marks, the most important of the several indications mentioned. However, in order that each dictation station will not require an additional control for this indexing device, with additional wiring running from the station, the present system is arranged to enable handy control of the indexing device through suitable manipulation of a combination of the aforementioned controls at the dictator's station. One convenient manipulation for the dictator to put the correction device in operation is to depress the station switch 57 momentarily during the recording operation—i. e., while holding depressed the start-stop switch 54. In order that this manipulation will so energize the device 95, the same is connected in a circuit 96 leading from the contact 79 of the motor control relay 68 to the end terminal of the stop coil 89 of the clutch actuator 91. Since the start coil 90 is the one last energized, and the pole 93 makes then momentarily with the end terminal of the stop coil 89, during the act of recording dictation, a momentary depression of the station switch 57 while this condition exists will cause relay 68 to be deenergized and the pole 78 to make with the contact 79 wherefore to complete a circuit from the power line 63 through the solenoid 95 via the line 81, pole 78, contact 79, line 96, pole 93 and lead 93*a*.

Although the relay 67 is also deenergized as the station switch 57 is operated, the discharge time of the coil of the relay 67 through the associated condenser 70 is large relative to that of the coil of the relay 68 through its associated condenser 71 so that the release of the relay 67 is delayed with respect to that of the relay 68. Therefore, the pole 86 of the relay 67 continues to make with the contact 88 until after the pole 78 of the relay 68 is returned to the contact 79 to enable a momentary completion of the circuit of the indicating device 95. As soon as the relay 67 releases the pole 86, however, a circuit is completed through the stop coil 89 of the clutch actuator 91 to cause the pole 93 to break contact with the stop coil 89 and to thereby open the circuit of the correction device 95. The correction device will accordingly be energized only momentarily, which is as desired. However, proper sequence of operation of switches 57 and 74 is required—i. e., the start-stop switch 74 must be held operated as the station switch 57 is depressed—else the clutch actuator pole 93 will not make with the line 96 to complete the circuit of the indicating device 95 as the relay 68 is deenergized. The required sequence comes however naturally to the dictator since he will want to make correction indications as soon as the need is detected and may do so simply by momentarily depressing the station switch 57 without otherwise interrupting his dictation-recording procedure.

An important feature of my invention which makes it feasible from a practical standpoint to serve several dictators' stations with the use of a single dictation-recording machine is in the provision of an intermediate control, herein in the form of a switch 97, to control a warning signal, or to provide any other suitable control action or indication, which normally will prompt the attendant to change the record on the machine at the first opportunity upon the dictator placing the handset 54 on its support, and thereby terminating a dictation period, after having recorded into an intermediate end zone on the record having less than sufficient recordation space therein for a succeeding dictation period of normal or average length. The preselected point along the record marking the beginning of this intermediate end zone is in the second half portion of the record, typically at a three-quarter point along the record for a record having fifteen minutes recordation time. The control switch 97 is accordingly herein termed an "intermediate end switch." This intermediate end switch is normally open and is operated closed by the carriage 29, as by a projecting arm 98 of the carriage slidably engaging a pole 99 of the intermediate switch, as the carriage moves past the selected intermediate point. On the pole 99 there is an extending dwell portion 99*a* which is engaged by the arm 98 to maintain the switch closed so long as the carriage is beyond the preselected point.

By way of illustration, the intermediate end switch 97 is herein shown as controlling a buzzer 100 at the attendant's station. The buzzer is connected from the line 81, which leads from the grounded side of the power line 63, through a lead line 101 including the buzzer and the intermediate switch, to the lead lines 81*a*. As the intermediate end switch is closed by the advancing movement of the carriage, the buzzer is not immediately operated because the pole 78 then engages the contact 80 to place a short across the buzzer through the lines 81 and 81*a*. However, as soon as the dictator hangs up the handset 54, the resultant opening of the station switch 57 causes the switch pole 78 to break with contact 80 wherefore to remove the short across the buzzer. The buzzer is then connected serially with the primary of transformer 85 across the power line 63 to cause both it and the busy signals to be energized, and to cause a neon light 103 at the attendant's station to be dimmed and to flicker as later described. Thus, as soon as the dictator finishes using the machine after having passed the selected intermediate point on the record, the attendant is warned that the record on the machine should be changed and all busy lights stay on to warn all dictators against now resuming operation of the machine. However, since the primary of the transformer 85 is now in series with the buzzer 100, the voltage fed to the busy lights is less and the busy lights are dimmer than normal.

Although only a moment is required to change a record on the machine, it is important that no dictator start using the machine until the record change is completed. Accordingly, the attendant is provided with a control switch 102 connected in shunt with the buzzer 100 and the intermediate end switch 97 from line 81 to line 81*a*. Before changing the record, the attendant closes the switch 102 to disable the buzzer and to complete the circuit of the primary of transformer 85 across the power line 63 to maintain all station busy lights on. This will restore the busy lights to normal brilliance. As a warning to the attendant that this control switch is closed, a signaling means suitably in the form of a neon light 103 is connected from the lead 81*a* to the lead 93*a* running to the ungrounded side of the power line. Thus, the attendant is provided with means to maintain the busy lights on at all stations during the changing of the record so as to warn the dictators against then proceeding with the recordation of any dictation; and also, the attendant is warned by the light 103 against inadvertently leaving the switch 102 closed and the busy lights on after the change of record is completed. The neon light 103 serves also as an indication to the attendant to inform her when the motor M is running since in normal use the circuit for this neon light is completed through the switch 78—80 only when the motor M is running. When the dictator completes dictating after the intermediate end switch has been closed, the neon light 103 remains on even though the motor M is now stopped, but the voltage across it will be only that appearing across the primary of the transformer 85 and will be interrupted because of the buzzer 101 being in circuit; as a result, the neon light 103 will be dimmer, the same as the busy lights L; in addition, the neon light will flicker. However, as soon as the attendant closes the manual switch 102, the neon light 103 is restored to normal brilliance.

Further, hand switch 102 may have a second pair of contacts 102*a* connected by leads 102*b* across the filter coils 66 and relay coil 67 in the communication circuit 12—13, so that when the hand switch is closed, preliminary to making a record change, a heavy hum will be fed into the communication circuit to warn a dictator positively against then attempting to record dictation, and the relay 67 is disabled to prevent a dictator from inadvertently starting the turntable.

In changing a record, the attendant releases the clamp 33, removes the record R from the turntable, puts on a new record, and restores the clamp. In order to warn the attendant against inadvertently failing to restore the clamp, a signaling means is provided as in the form of a light 104. This light is controlled to give a steady light whenever the record clamp is in operative position and to give a flashing light when the clamp is released. For this purpose, a flashing device 105 is provided, which for instance may be a low-frequency electronic oscillator of the form shown in the pending application Serial No. 35,885 of Richard M. Somers, filed June 29, 1948, entitled "Signaling Systems for Dictating Machines," and having a common assignee with the present application. Such electronic flashing device is well known in the art and need not be herein described, it being accordingly shown only diagrammatically in the drawing. Sufficient for the present purposes are the statements that this device is supplied with power through a lead line 106, that the device has a control switch 107 which when open will cause steady current to be fed to the signal light 104 and which when closed will cause intermittent current to be supplied to the light to cause the light to flash, and that the device has an output lead 108 for supplying an intermittent electric current for other signaling purposes. In accordance with the signaling here desired, the switch 107 is coupled to the clamp 33 through a mechanical connecting means 109 to cause the switch to be closed when the clamp is released and to be open when the clamp is in operative position.

As heretofore explained, the underlying concept on the basis of which I provide the novel intermediate end switch 97 is that the usual length of a dictation period requires normally a definite portion of the recordation time on the dictating-machine record. By positioning this switch so that there is a normal dictation period of recordation time on the record following the switch, and by providing apparatus controlled by this switch to cause the attendant to be warned by the buzzer 100 whenever the dictator hangs up the hand set 54 after having recorded beyond the selected intermediate point on the record, a record change will be made before the next dictator begins using the machine. Thus, each dictator is normally assured of having available not less than sufficient recordation space on the record for a normal dictation period.

Since the attendant needs only a moment to change a record, such a change will normally be completed well within the interim period between the completion of a dictation period by one dictator and the start of another dictation period by a second dictator. Accordingly, the dictators are normally unaware that the availability of the machine is momentarily suspended. This will be true even when a dictator records through several dictation periods in succession since he will hang up the hand set 54 momentarily to arrange his material before beginning the next-succeeding period. If the dictator does not hang up the telephone instrument at the completion of a dictation period it will be normally for the purpose of recording a few short notes or short memoranda. In view of the machine being controlled in the manner above described, there will normally be sufficient space on the record for the recordation of such short matters.

If the dictator should proceed to near the end portion of the record, a warning signal is fed into the communication circuit, to be heard through the receiver 56, to apprise the dictator that he is nearing the end of the record. Typically, this signal is initiated when there is left only about thirty seconds of recordation time on the record. This signal is obtained from the line 108 of the flasher device 106, which line may have a usual blocking condenser 100. In order that the flashing circuit will be then operative, and the attendant will be warned by the light 104 of the impending need for a record change, a switch 111 is connected in shunt with the switch 107 and is positioned in the path of the arm 98 of the carriage to cause it to be closed as the carriage nears the end portion of its travel. After the carriage has closed the switch 111, the same moves the elements of this switch 111 onwardly against an insulating button 112 provided on a switch arm 113 connected to the line 108 from which the end signaling is obtained, as just described. The onward movement of the carriage causes the switch arm 113 to engage a switch arm 114 which connects to the filtered side of the communication circuit, wherefore to feed the signal from the device 105 to the receiver 56 at the dictator's station. This is a short periodic signal repeated at a relatively slow rate and at a low level so as not to disturb the dictator or to destroy the intelligibility of the signals in the communication circuit to be recorded. Thus, the dictator is permitted to finish the recordation of a last few words or a sentence after this end signal comes on. However, as the carriage nears the very end of the record, the switch arm 114 is moved into engagement with a switch arm 115 that is connected to the unfiltered side of the communication circuit. The effect of this connection is to short out the filter coils 66 and relay coil 67 in the communication circuit to cause the drive system to be disabled and to cause heavy hum to be fed from the rectifier 61 to the receiver 56, the same as when the hand switch 102 is closed, as hereinbefore explained. This hum from the rectifier 61 has such frequency and level as to destroy the intelligibility of any signals fed into the communication circuit from the microphone and to apprise the dictator positively of the necessity of terminating the recordation as to that record.

After having received the heavy warning signal from the rectifier 61, the dictator will hang up the hand set 54 and await the change of record by the attendant. The attendant will be warned doubly to make this change immediately since not only the buzzer 100 will then come on but also the light 104 will flash and the neon light 103 will be dimmed and will flicker. As an incident of making the record change, the attendant will return the carriage to its initial position and will cause all of the switch arms 111 through 115 to be restored to their open condition as shown in the drawing. After putting a new record on the turntable, restoring the record clamp 33 and then opening the switch 102, the machine will be ready for recordation of dictation on the new record. The dictator will be apprised of this condition by the busy lights going off as the attendant opens the switch 102. Upon the dictator then removing the hand set 54 from its support, he will reserve the machine for his further use, and this reservation will be made known at all other dictating stations by the fact that the busy lights are then again on.

I have herein shown and described my invention in terms of a certain preferred form of remotely-controlled dictation-recording system, but it will be understood that this particular embodiment is intended to be illustrative and not necessarily limitative of my invention since my invention is subject to many changes and modifications without departure from the scope and spirit thereof. Also, it will be understood that many features of my invention are applicable to other than remote dictation-recording machines such as to the usual machine where the dictator sits within reach of the controls on the machine itself, and that I intend no unnecessary limitation to remotely-controlled dictation-recording systems. I intend to cover in the following claims all changes and modifications of the example of the invention herein chosen for purposes of the disclosure, which do not constitute departures from the spirit and scope of the invention.

I claim:

1. In a remotely-controlled phonographic system comprising an attendant's station including a phonographic machine having a rotatable record-supporting device, a translating device, means mounting one of said devices for traveling movement relative to the other, and drive means for rotating said record-supporting device and for effecting traveling movement of said one device: the combination of a remote operator's station including operator's equipment comprising a transducer and an on-off station switch for said machine; circuit means for connecting said transducer and station switch to said phonographic machine; means controlled by said station switch to render said machine operable from said operator's station when said station switch is in "on" position; a sound-type signaling device at said attendant's station, an intermediate end switch operable by said one device as the same passes a selected intermediate point in its path of travel spaced substantially from the end of its travel range, and means controlled by said station switch and said intermediate end switch to cause said signaling device to be energized when said station switch is returned by the operator to "off" position while said one device is beyond said intermediate point.

2. In a remotely-controlled dictation-recording system comprising an attendant's station including a recording machine having a movable record-supporting device, a recording device, means mounting one of said devices for traveling movement relative to the other, and controllable drive means for moving said record-supporting device and for concurrently effecting traveling movement of said one device: the combination of a remote dictator's station including a microphone, a station switch, and start-stop means for said drive means; means controlled by said station switch to connect said microphone to said recording device and said start-stop means to said drive means when said station switch is in "on" position; and means to apprise when a dictator has finished using the system after having recorded beyond a predetermined point of travel of said one device, comprising an indicating device, an intermediate end switch operable by said one device as the same is advanced through said predetermined point, and means controlled by said station switch and said intermediate end switch to render said indicating device operative as said station switch is moved to "off" position while said intermediate switch is in operated position.

3. In a remotely-controlled dictation-recording system comprising an attendant's station including a recording machine having a movable record-supporting device, a recording device, means mounting one of said devices for traveling movement relative to the other, and drive means for moving said record-supporting device and for concurrently effecting traveling movement of said one device: the combination of a plurality of remote dictators' stations each including a microphone, a station switch, and start-stop means for said drive means; inter-station means for operatively connecting said microphones to said recording device via said station switches and for connecting said start-stop means to said drive means whereby a dictator at each station may record dictation spoken into said microphone on placing the respective station switch in closed position and said start-stop means in start position; and means to apprise when a dictator has finished using the system after having recorded beyond a predetermined point of travel of said one device spaced substantially from the end of its travel range, comprising an indicating device, an intermediate end switch operable by said one device as the same is advanced through said predetermined point, a relay coil having an associated pair of contacts, means connecting said relay coil to said station switches whereby the coil is energized when any one of said station switches is closed, and circuit means including said intermediate end switch and said relay contacts for controlling said indicating device to cause said indicating device to be operative when all of said station switches are in open position and said intermediate end switch is in operated position.

4. In a remotely-controlled dictation-recording system comprising an attendant's station including a recording machine having a movable record-supporting device, a recording device, means mounting one of said devices for traveling movement relative to the other, drive means for moving said record-supporting device and for concurrently effecting traveling movement of said one device, and a drive control relay for said drive means: the combination of a remote dictator's station including a microphone, a receiver and start-stop means for said drive means; for connecting said microphone and receiver in one line to said attendant's station and for connecting said start-stop means to said drive control relay; first and second end switches operable sequentially by said one device as the same is advanced through a predetermined end portion of its forward travel; signaling means for producing distinguishable warning signals; means controlled by said first end switch for causing said signaling means to feed a warning signal into said line when the dictator has recorded to said predetermined end portion, said warning signal being of such character that it does not destroy the intelligibility of the signals to be recorded from said microphone; and means controlled by said second end switch when the dictator has recorded through said predetermined end portion for stopping said drive means and for causing said signaling means to feed a warning signal into said line adapted to destroy the intelligibility of the signals to be recorded from said microphone.

5. In a machine including a record support, translating means, means mounting said support and translating means for relative traveling movement, and drive means for producing said relative traveling movement: the combination of a dictator's microphone and receiver; a communication line for connecting said microphone and receiver to said translating means; means for producing low and high level signals respectively; means, including a control switch operable by said drive means as said translating means reaches a predetermined point near the end of the record, for feeding a low-level warning signal from said signal producing means into said communication line when the translating means reaches said predetermined point; and means, including a control switch operable by said drive means when said translating means reaches substantially the end of the record, for feeding a relatively high-level signal from said signal producing means into said line when the translating means reaches the end of the record.

6. In a remotely-controlled dictation-recording system including a dictating machine having a movable record-supporting device, recording and reproducing translating devices, means mounting said translating devices for traveling movement relative to said supporting device, a drive motor, and a drive transmission including a clutch whereby the drive motor effects movement of said supporting device and concurrent relative traveling movement of said translating devices: the combination of a communication circuit leading from said dictating machine to a remote station and including a source of direct current, a resistance-type microphone, a receiver, a primary winding of an audio transformer, and first, second and third relays adapted to operate at successively-higher current levels; manually-operable current-control means in said communication circuit selectively operable to establish in said circuit first, second and third current levels to operate said relays respectively; means controlled by said first relay for starting said motor; means controlled by said second relay for closing said clutch; and means controlled by said third relay for conditioning said system for recording on or reproducing from the record.

7. In a remotely-controlled dictation-recording system having a phonographic machine for recording on a supported record and for effecting playback: the combination of an electrically-operable indexing device effective when momentarily energized to make an indication for a transcriber; a remote operator's station having a transducer connected to the audio apparatus of said phonographic machine and having an on-off station control means connected to said phonographic machine and effective when moved to "on" position to condition said machine for start-stop operation; a start-stop means at said station for said machine; means for supplying energizing current to said indexing device including circut-preparing means; means controlled by said start-stop means and effective as said start-stop means is moved to start position for operating said preparing means; and means controlled by said on-off station control means and effective as said station control means is moved to "off" position while said preparing means is operated for rendering said current-supplying means operative.

8. In a remotely-controlled dictation-recording system having apparatus for recording on a supported record and for effecting playback, and including an indexing device for making indications for a transcriber: the combination of a remote dictator's station including an on-off switch; circuit means for connecting said remote station to said apparatus via said station switch; means for operating said indexing device including a controllable switch means and operation-preparing means having effective and ineffective conditions; current-energizable means for controlling said switch means; and means connecting said current-energizable means in said circuit means to cause operation of said indexing device upon interruption of said circuit means by said station switch while said preparing means is in effective condition.

9. In a dictation-recording system having apparatus for recording on a moving record including a recording device and drive means including a motor and clutch: the combination of a dictator's station; a communication circuit leading from said station to said recording apparatus and having therein a source of D.-C. potential; means in said circuit at said station including a resistance-type microphone, a station switch, a series resistance and a control switch operable to increase the level of direct current in said circuit; means in said communication circuit at said recording apparatus comprising a first relay operable by the lower-level current in said circuit when said station switch is closed, and comprising a second relay operable by the higher-level current in said communication circuit when said control switch is also closed; a motor circuit controlled by said first delay to start said motor when said station switch is closed; a clutch circuit controlled by said second relay to engage said clutch when said control switch is closed; an indexing device for making indications for a transcriber; and means for operating said indexing device as an incident of opening said station switch while said control switch is held closed, comprising a current-supply circuit for said indexing device, means operable by said second relay for preparing said circuit for energization of said indexing device, and means operable by deenergization of said first relay while said preparing means is operated for closing said supply circuit.

10. The combination set forth in claim 4 wherein the signals produced by said signaling means are fed via said receiver to said dictator, including an attendant's signaling means, and means controlled by said second control switch for causing said attendant's signaling means to operate when the dictator has recorded to substantially said end of the record.

11. In a remotely-controlled dictation-recording system including apparatus for recording on a moving record and a plurality of remote dictator's stations: the combination of busy-signaling means at said stations; operating apparatus at said dictators' stations and respective circuit means for connecting said stations in parallel with said recording apparatus whereby a dictator at any one station may record dictation on said record; on-off switches at said stations respectively; means effective when any station switch is closed to cause all of said busy-signaling means to give busy signals; means at said recording apparatus for signaling an attendant when a change of record is needed comprising a sound signaling device; an intermediate switch operable by said recording apparatus when a dictator records beyond a predetermined point on a record; means, operable upon all of said station switches being in open position and said intermediate switch being in operated position, for energizing said attendant's sound signaling device; and means controlled by said intermediate switch and effective while said intermediate switch is operated for maintaining said busy-signaling means in operation at all stations independently of the positioning of said station switches.

12. In a remotely-controlled dictation-recording system including apparatus for recording on a moving record and a plurality of remote dictator's stations: the combination of busy-signaling means at said stations; circuit means connecting said stations in parallel with said recording apparatus whereby a dictator at any one station may record dictation on said record; on-off switches at said stations respectively; circuit means effective when any station switch is closed to cause all of said busy-signaling means to give busy signals of normal character; an intermediate switch operable by said recording apparatus when a dictator records beyond a predetermined point on the record; and means controlled by said intermediate switch and said station switches and effective when all of said station switches are open and said intermediate switch is in operated position to cause said busy-signaling means to give busy signals of different character.

13. In a remotely-controlled phonographic system comprising an attendant's station including a phonographic machine having a rotatable record-supporting device, a translating device, means mounting one of said devices for traveling movement relative to the other, and drive means for rotating said record-supporting device and for effecting traveling movement of said one device: the combination of a remote operator's station including a transducer and an on-off station switch for said machine; interstation circuit means connecting said transducer and station switch to said phonographic machine to enable operation of said machine from said operator's station when said station switch is in "on" position; a busy-signaling means at said remote station; means to cause said busy-signaling means to be effective while said station switch is in "on" position; a control switch and means to cause the same to be operated as said one device passes a selected intermediate point in its path of travel; and means rendered effective by said control switch while the same is in operated position to maintain said busy-signaling means in operation independently of the positioning of said station switch.

14. In a remotely-controlled dictation-recording system: the combination of a dictating machine including relatively movable record-supporting and record-cooperable translating devices, and drive means for moving one of said devices through a prescribed range of travel; a plurality of dictators' stations each including a microphone, a start-stop control for said drive means and an on-off station switch; circuits for connecting said stations to said machine; a control circuit connected to a source of potential and including a current-energizable element utilized in the control of said system; first and second switches in said control circuit effective to cause an operation of said current-energizable element when both switches are placed in predetermined respective positions; means for placing one of said switches in its said predetermined position by said one device as said one device in its travel passes a predetermined intermediate point spaced substantially from the end of its travel range; and means controlled by said station switches and effective to place the second of said switches in its said predetermined position only when all of said station switches are in "off" positions.

15. In a remotely-controlled dictation-recording system including an attendant's station hava dictating machine, said machine including a supporting device onto and from which a record may be mounted and removed, a record-cooperable translating device and drive means for moving one of said devices through a prescribed range of travel including a drive motor: the combination of a plurality of remote dictators' stations each including a microphone, start-stop means for said drive means and an on-off station switch; circuit means for connecting said remote stations to said phonographic machine; means connected to said circuit means for starting said drive motor when any one of the station switches of said remote stations is closed; and means for signaling an attendant to change a record on said supporting device when a dictator finishes dictating after having recorded beyond a predetermined point of travel of said one device spaced substantially from the end of its travel range, comprising an attendant's sound buzzer, an intermediate end switch, means for causing operation of said intermediate end switch as said one device passes said intermediate point, means controlled by said intermediate end switch and said station switches and effective when said intermediate end switch is in operated position and all of said station switches are in open position for rendering said buzzer operative, an attendant's light signaling means, and means for controlling said light signaling means according to whether said drive motor is running or not.

16. In a dictation-recording system including an attendant's station having apparatus for recording progressively on a supported record: the combination of a plurality of dictators' stations each including an on-off station switch; circuit means for connecting said dictators' stations to said recording apparatus; means at each of said dictators' stations operable upon the respective station switch being moved to "on" position for controlling said recording apparatus to record dictation via said circuit means; an attendant's sound-type signaling device; an intermediate end switch operated by said recording apparatus as recordation proceeds to an intermediate end zone on the record; means to cause said sound-type signaling device to be put into operation upon all of said station switches being placed into "off" position while said intermediate end switch is in operated position; a device at said attendant's station for producing a light signal; and means controlled by said station switches and influencing said light signaling device for producing a change in the signaling of said light signaling device between a condition when all of said station switches are in "off" position and a condition when at least one of any of said station switches is in "on" position.

17. The combination set forth in claim 16 including means connecting said intermediate end switch to said energizing circuit for said light signaling device and means controlled by said intermediate end switch and by said station switches for causing said light signaling device to produce a light signal of one character when said intermediate end switch is in operated position and all of said station switches are in "off" position and to produce a light signal of another character when said intermediate end switch is in operated position and any one of said station switches is in closed position.

18. In a remotely-controlled dictation-recording system comprising an attendant's station including a dictating machine having a movable support onto and from which a record may be mounted and removed, a record-cooperable recording device, and drive means operative to produce a relative advance movement between said record support and recording device for scanning a supported record by said device, said machine being arranged so that the time of scanning a complete record is equal to the recordation time of a plurality of prescribed average dictation periods: the combination of a plurality of remote dictators' stations and interstation wiring for connecting each dictator's station to said dictating machine; apparatus at each dictator's station for operating said dictating machine to record dictation, said apparatus at each dictator's station including an on-off station switch for connecting certain elements of said apparatus to said machine via said interstation wiring to enable recordation of dictation from the station while the station switch is in "on" position; a control device operated by said machine in response to relative advance movement between said record support and translating device past a predetermined scanning point where the scanning time remaining on the record is of the order of that required for a single one of said dictation periods; electrically-energizable means to be operated in the control of said recording system; and means controlled by said station switches and control device for causing operation of said electrically-energizable means upon all of said station switches being in "off" position while said translating device is advanced beyond said predetermined scanning point.

19. The combination set forth in claim 18 wherein said electrically-energizable means comprises a busy signaling means at each dictator's station and an attendant's signaling means at said attendant's station for informing the attendant to change the record on said support.

RICHARD KOBLER.

References Cited in the file of this patent

UNITED STATES PATENTS

| Number | Name | Date |
|---|---|---|
| 1,206,987 | Clausen | Dec. 5, 1916 |
| 2,042,228 | Huenlich | May 26, 1936 |
| 2,066,672 | De Berard et al. | Jan. 5, 1937 |
| 2,151,951 | Warren | Mar. 28, 1939 |
| 2,200,351 | Whitehead et al. | May 14, 1940 |
| 2,277,207 | Chenoweth et al. | Mar. 24, 1942 |
| 2,305,681 | Dunning | Dec. 22, 1942 |
| 2,306,614 | Clausen | Dec. 29, 1942 |
| 2,333,235 | Clausen | Nov. 2, 1943 |
| 2,366,956 | Clausen | Jan. 9, 1945 |
| 2,375,525 | Clausen | May 8, 1945 |
| 2,489,396 | Bowne | Nov. 29, 1949 |
| 2,497,037 | Somers | Feb. 7, 1950 |